(12) United States Patent
Rice

(10) Patent No.: US 11,781,586 B2
(45) Date of Patent: *Oct. 10, 2023

(54) EXPANDABLE DIAMETER FASTENER

(71) Applicant: Sky Climber Fasteners LLC, Delaware, OH (US)

(72) Inventor: Donald W. Rice, Delaware, OH (US)

(73) Assignee: BPC LG 2, LLC, Charlotte, NC (US)

(*) Notice: Subject to any disclaimer, the term of this patent is extended or adjusted under 35 U.S.C. 154(b) by 9 days.

This patent is subject to a terminal disclaimer.

(21) Appl. No.: 17/580,735

(22) Filed: Jan. 21, 2022

(65) Prior Publication Data

US 2022/0213920 A1  Jul. 7, 2022

Related U.S. Application Data

(63) Continuation of application No. 15/661,710, filed on Jul. 27, 2017, now Pat. No. 11,261,903.

(60) Provisional application No. 62/400,562, filed on Sep. 27, 2016, provisional application No. 62/367,688, filed on Jul. 28, 2016.

(51) Int. Cl.
*F16B 39/24* (2006.01)
*F16B 43/00* (2006.01)
*F16B 33/00* (2006.01)
*F16B 39/02* (2006.01)

(52) U.S. Cl.
CPC ............ *F16B 39/24* (2013.01); *F16B 33/002* (2013.01); *F16B 43/00* (2013.01); *F16B 39/02* (2013.01); *F16B 2200/10* (2018.08)

(58) Field of Classification Search
CPC ........ F16B 33/002; F16B 39/02; F16B 39/24; F16B 39/26; F16B 43/00; F16B 2200/10
USPC .................. 411/132, 133, 134, 147–148
See application file for complete search history.

(56) References Cited

U.S. PATENT DOCUMENTS

| | | | |
|---|---|---|---|
| 665,705 A * | 1/1901 | Summerer | ............ F16B 13/065 411/33 |
| 1,121,962 A | 12/1914 | Williston | |
| 1,787,114 A | 12/1930 | Lelean et al. | |
| 2,063,335 A | 12/1936 | Alfred | |
| 2,125,878 A | 8/1938 | Beasley | |
| RE21,612 E | 10/1940 | Williams | |
| 2,365,433 A | 12/1944 | Polizzi | |
| 2,651,241 A | 9/1953 | Lloyd | |
| 2,713,482 A | 7/1955 | Stapleton | |
| 2,936,805 A | 5/1960 | Rice | |
| 3,129,742 A | 4/1964 | Faroni et al. | |
| 3,283,640 A * | 11/1966 | Teizo | .................... F16B 13/068 411/33 |
| 3,459,095 A | 8/1969 | Hsu | |
| 3,513,753 A | 5/1970 | Phillips | |
| 4,033,222 A | 7/1977 | Wilson | |
| 4,147,458 A | 4/1979 | Elders | |
| 4,802,785 A | 2/1989 | Richards | |
| 5,080,544 A | 1/1992 | Bruyere | |
| 5,203,647 A | 4/1993 | Blackwell | |
| 5,320,466 A | 6/1994 | Suzuki | |
| 5,360,303 A | 11/1994 | Behrens et al. | |

(Continued)

*Primary Examiner* — Roberta S Delisle

(74) *Attorney, Agent, or Firm* — DAWSEY CO., LPA; David J. Dawsey

(57) ABSTRACT

A fastener system for use in securing objects, such as stress skinned panels, to a structural support, such as an aircraft spar or cross member. The fastener system includes a radially-expandable collar assembly.

20 Claims, 11 Drawing Sheets

(56) References Cited

U.S. PATENT DOCUMENTS

| | | |
|---|---|---|
| 6,494,659 B1 | 12/2002 | Lutkus et al. |
| 6,726,422 B2 | 4/2004 | Giannakakos |
| 9,470,253 B2 | 10/2016 | Ostlind |
| 9,845,822 B2 | 12/2017 | Pailhories |
| 2004/0120789 A1 | 6/2004 | Masuda |
| 2016/0327083 A1 | 11/2016 | Lin |

* cited by examiner

EXPANDABLE DIAMETER FASTENER

CROSS REFERENCE TO RELATED APPLICATIONS

This application is a continuation of U.S. patent application Ser. No. 15/661,710, filed on Jul. 27, 2017, which claims priority to U.S. Provisional Application Ser. No. 62/400,562 filed Sep. 27, 2016 and U.S. Provisional Application Ser. No. 62/367,688, filed Jul. 28, 2016, the disclosures of which are hereby incorporated by reference.

STATEMENT REGARDING FEDERAL GRANTS

Not Applicable.

BACKGROUND OF THE INVENTION

The present disclosure relates to a fastener system for attaching components to a panel, such as a honeycomb panel. In a preferred embodiment, the fastener is used to attach a panel that is a honeycomb wall panel used in aircraft manufacture.

Honeycomb panels are widely used in the manufacture of lightweight partition systems, in particular the walls, ceilings and floors of commercial aircraft. Such panels typically have two sheets serving as outer skins of the panel, and sandwiched inside is a crosswise support system, such as a series of hexagonal cells or the like. The skins are affixed to the inner cross support to form a generally rigid panel that can be used to form enclosures. Void-core panels (of which a honeycomb aspect is one type) are widely used in aircraft, as they form a lightweight and structurally sound panel that can be made to conform to a curved shape. By varying the type of skin on the panels, such void core panels can be readily adapted to form floors, internal partitions and the like. For example, Hexcel Corporation of Burlington, Wash., USA markets FIBRELAM™ honeycomb sandwich panels for use in aircraft flooring. See also U.S. Patent Publication US 20090072086 A1.

Existing panel attachment systems utilize a variety of structures, but in general major OEMs are unsatisfied with both the price and performance of those fasteners. When installing components onto the surface of a void-core panel, a panel insert is typically inserted into a hole drilled or routed into the void-core panel. Such an insert can be either an insert that allows a threaded fastener, i.e. a bolt, to pass through the panel (a through insert), or the insert may not pass entirely though the panel (a floating insert).

Existing panel inserts are produced, for example by Marketing Masters of Issaquah, Wash. USA. Panel inserts may be structurally bound in place, by an expanded bulb, for instance, or they may be locked by a flexible pawl, or affixed by an adhesive or glue. One common fixing means in aircraft manufacture is "potting in" a panel insert by introducing a glue, such as catalytic epoxy resin, into the void of the panel to hold a panel insert in position by a physically retaining glue mass.

An important issue with current potted in inserts is that such inserts have limited structural integrity. There exists a continued need for an insert that maximizes the structural capabilities of void-core panels. An additional difficulty in using potted in inserts is the need for a bolt fastener driven into the insert to maintain a specified torque tolerance even when in use in an environment that imposes a wide range of temperatures and vibration patterns. As such a locking mechanism is important, and may be absolutely required, depending on the particular application. Currently, the only effective locking or retaining system available for floating inserts is a retaining collar made of resilient material, such as Dupont Vespel™.

Existing floor panel attachment systems utilize a variety of structures. One fastener is a simple bolt or cap screw retained by a threaded nut. Other fasteners utilize a U-shaped clip to retain a threaded bolt; yet other fasteners use a nut riveted to a structural member which then retains an inserted stud. These systems may be less desirable because of the difficulty in aligning stud holes with the nut when retaining a panel.

Other fasteners in the aircraft industry each have certain limitations. For example, U.S. Pat. No. 8,075,234 discloses a fastener system commonly used in the aircraft industry. United States Patent Application 20060137294A1 discloses an elastomeric sleeve and retainer assembly. Current fasteners are relatively expensive, are relatively heavy, require labor-intensive implementation, are difficult to assemble, and have suboptimal reliability and strength. Some additional types of fasteners have been disclosed at: http://www.shur-lok.com/salesapp/product_dls/Advance_Composites.pdf.

These current systems are generally not completely acceptable. An improved fastener system is desired by manufacturers and retrofitters to reduce the cost of current fasteners, and it is also desirable to enable labor savings along with improved assembly processes and reliability and strength.

BRIEF DESCRIPTION OF THE DRAWINGS

For a fuller understanding of the nature and advantages of the present invention, reference should be had to the following detailed description taken in connection with the accompanying drawings, in which.

DETAILED DESCRIPTION OF THE INVENTION

The present disclosure relates to a fastener system for mounting objects, such as panels, onto a structural member.

In a preferred embodiment, the fastener system mounts, affixes, or retains a honeycomb floor panel securely to the floor cross members or walls of an aircraft fuselage.

Figure 1A:
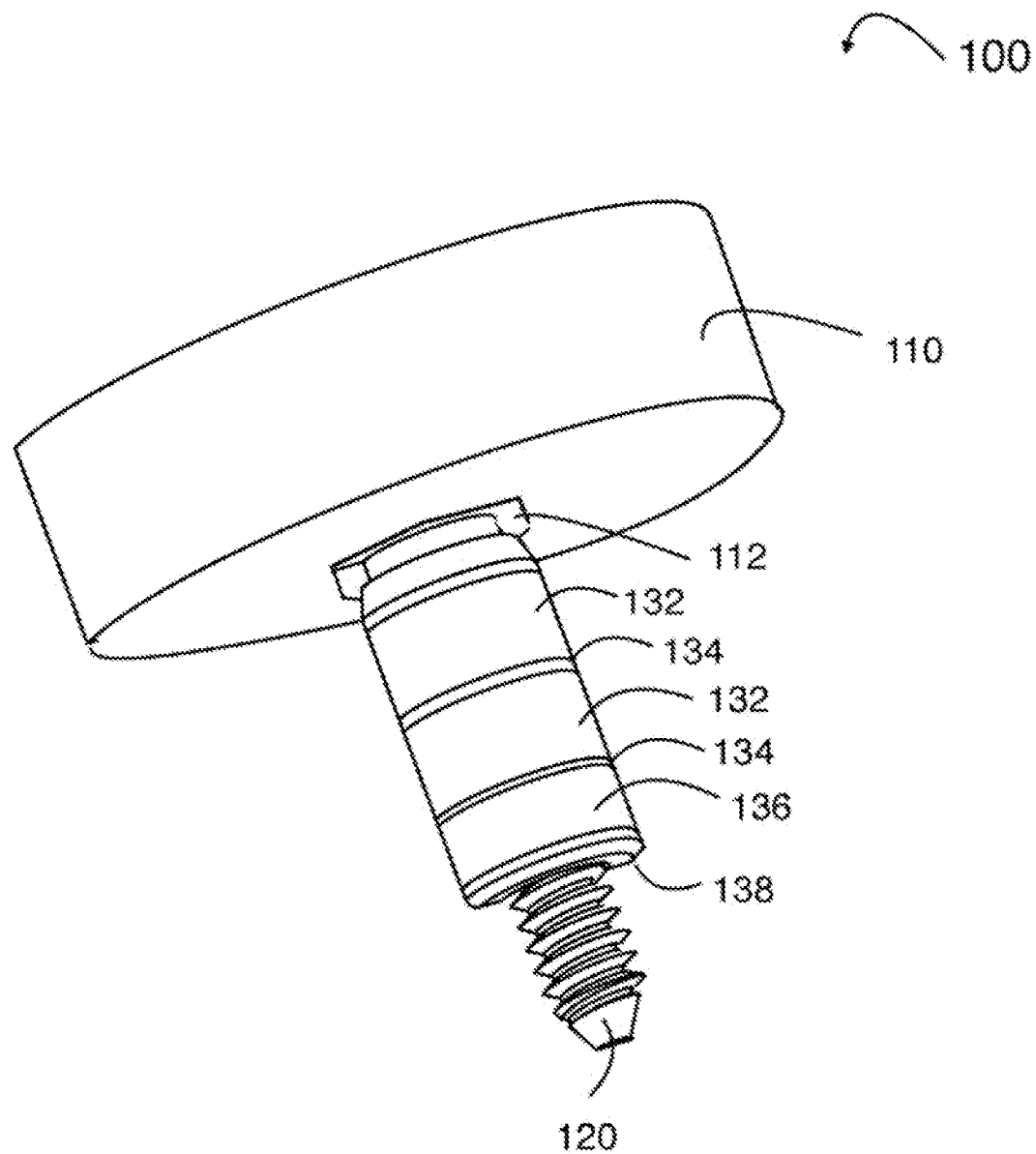
FIG. 1A shows a perspective view of the top and bottom nuts of a bolt-lock fastener.
Figure 8:
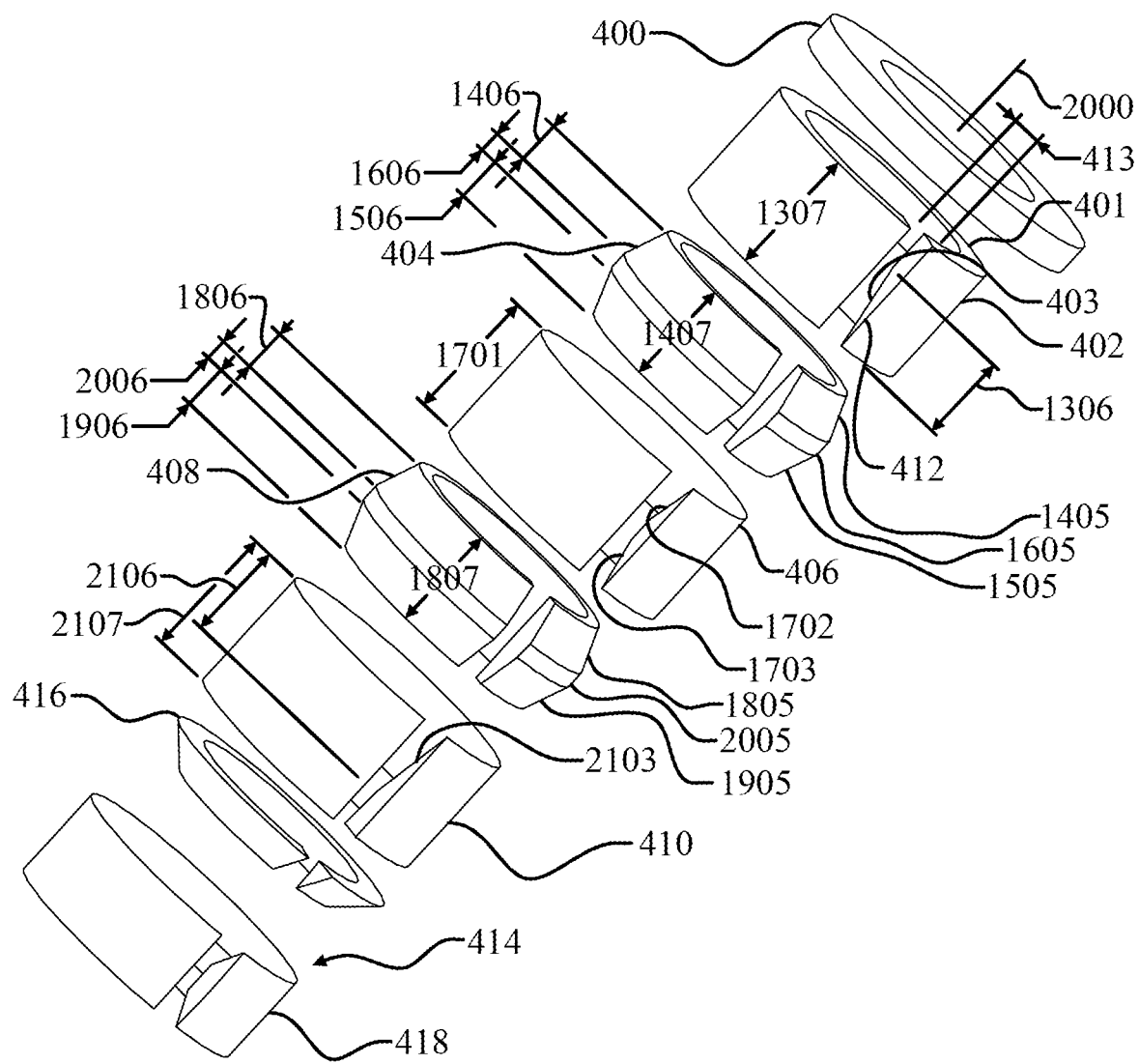
FIG. 8 shows an exploded view of the collar assembly along with several enlarged views of the collars of the collar assembly.

FIG. 1A discloses a bolt-lock fastener assembly, which includes a bolt-lock fastener (100). A bolt-lock (110) may be coupled to a shaft (120). In the embodiment of FIG. 1D, the bolt-lock (110) has an internal bore (112) through which a portion of the shaft (120) passes. Further, the shaft (120) may include a head (124) having a tool-engagement feature (122), seen in FIGS. 1B and 1D, such as a screw-driver receiver. A gasket (125), seen in FIG. 1D, may be located between the head (124) and the bolt-lock (110). Additionally, the internal bore (112) may incorporate a stop feature (131), seen in FIG. 1D. An anti-rotator assembly (114) may be located at an end of the bolt-lock fastener, such as opposite the end with the bolt-lock (110). An anti-rotator assembly (114) may include a nut, a nut and a washer, or another combination of objects that serve to prevent or limit the bolt-lock fastener from rotating. A bolt-lock (110) may comprise a nut and a washer. By rotating the bolt-lock in one direction, the bolt-lock fastener may be driven downwards and into a closed position. Pressure exerted by the rotation of the bolt-lock fastener, may result in compression and expansion of the collar or collars, such as the first female collar (132) and the first male collar (134) seen in FIG. 1D, in which the channel of the collars is enlarged. In the closed position, one or more collars with a vertical slit (412), labeled in FIG. 8, having a slit width (413), which surround the shaft may expand outward. By rotating the bolt-lock fastener in an opposite direction, such as the counter-clockwise direction, the bolt-lock and/or the bolt-lock fastener may be drawn away from the panel, or other object, and into an open position. In the open position, the pressure that was placed on the bolt-lock fastener may be decreased, which may allow one or more collars of a collar assembly which may surround the shaft to return to the open position in which the vertical channel formed by collar decreases in horizontal length to its horizontal length without compression. At least one diameter of the collar assembly may be decreased in the open position as compared to the diameter of the collar assembly in the closed position, which may then facilitate removal of the bolt-lock fastener assembly from an aperture in an object such as skin stress panel or honeycomb panel. In some embodiments, the anti-rotator assembly may need to be removed or loosened before the bolt-lock fastener assembly may be removed from the object, such as a skin stress panel assembly. The embodiment of FIG. 1D may include a threaded sleeve (138) that cooperates with the shaft (120). In such an embodiment the first female collar (132) and the first male collar (134) fit over the sleeve (138). As seen in FIG. 1A, multiple female collars (132) and multiple male collars (134) may be incorporated. Further, an end section female collar (136), seen in FIGS. 1A and 1D, may be incorporated to abut a portion of the sleeve (138), and the abutment occurs at an angled abutment surface having an abutment angle that is different from a cooperation angle located at the interface of the end section female collar (136) and the male collar (134). The end section female collar (136) may be configured as the collar retainer assembly (414), as seen in FIG. 8, including a female collar retainer (418) and a male collar retainer (416), which may abut the lower female collar (132) of FIG. 1D, which may be the equivalent of the female collar (410) of FIGS. 2 and 8, and all the related disclosure applies. However, the end section female collar (136) may be absent and the lower female collar (132) may extend to the flared surface of the threaded sleeve (138).

Figure 1B:
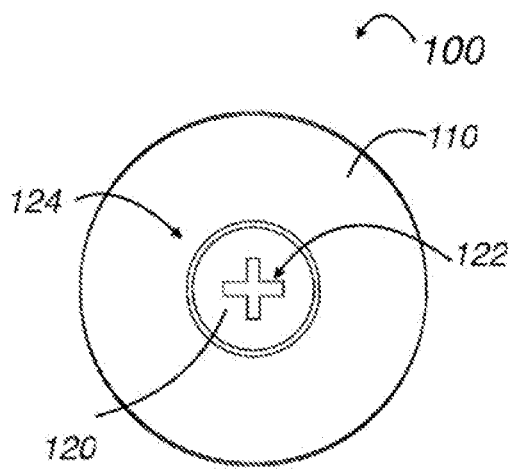
FIG. 1B shows a top plan view of a bolt-lock fastener.

FIG. 1B shows a top view of a bolt-lock fastener assembly.

Figure 1C:
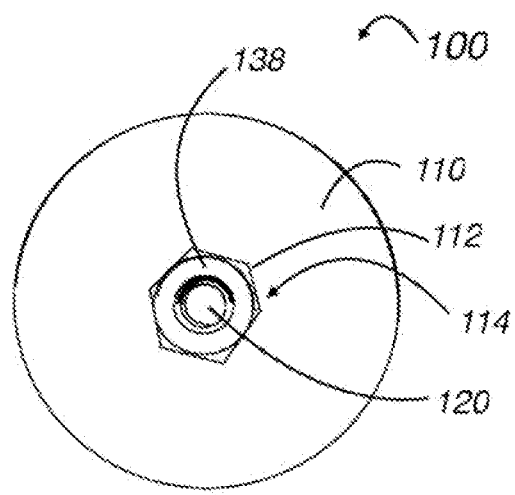
FIG. 1C shows a bottom plan view of a bolt-lock fastener.
Figure 1D:
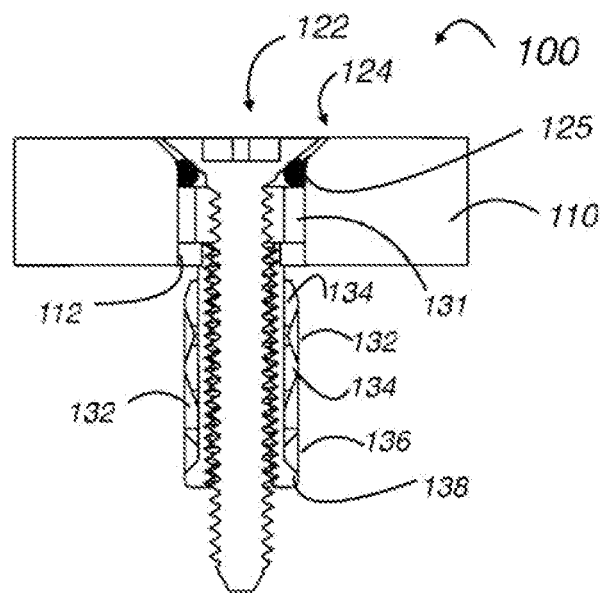
FIG. 1D shows a cross-sectional view of a bolt-lock fastener.

FIG. 1C shows a bottom view of a bolt-lock fastener assembly.

FIG. 1D shows a cross sectional view of a bolt-lock fastener assembly.

Figure 2:
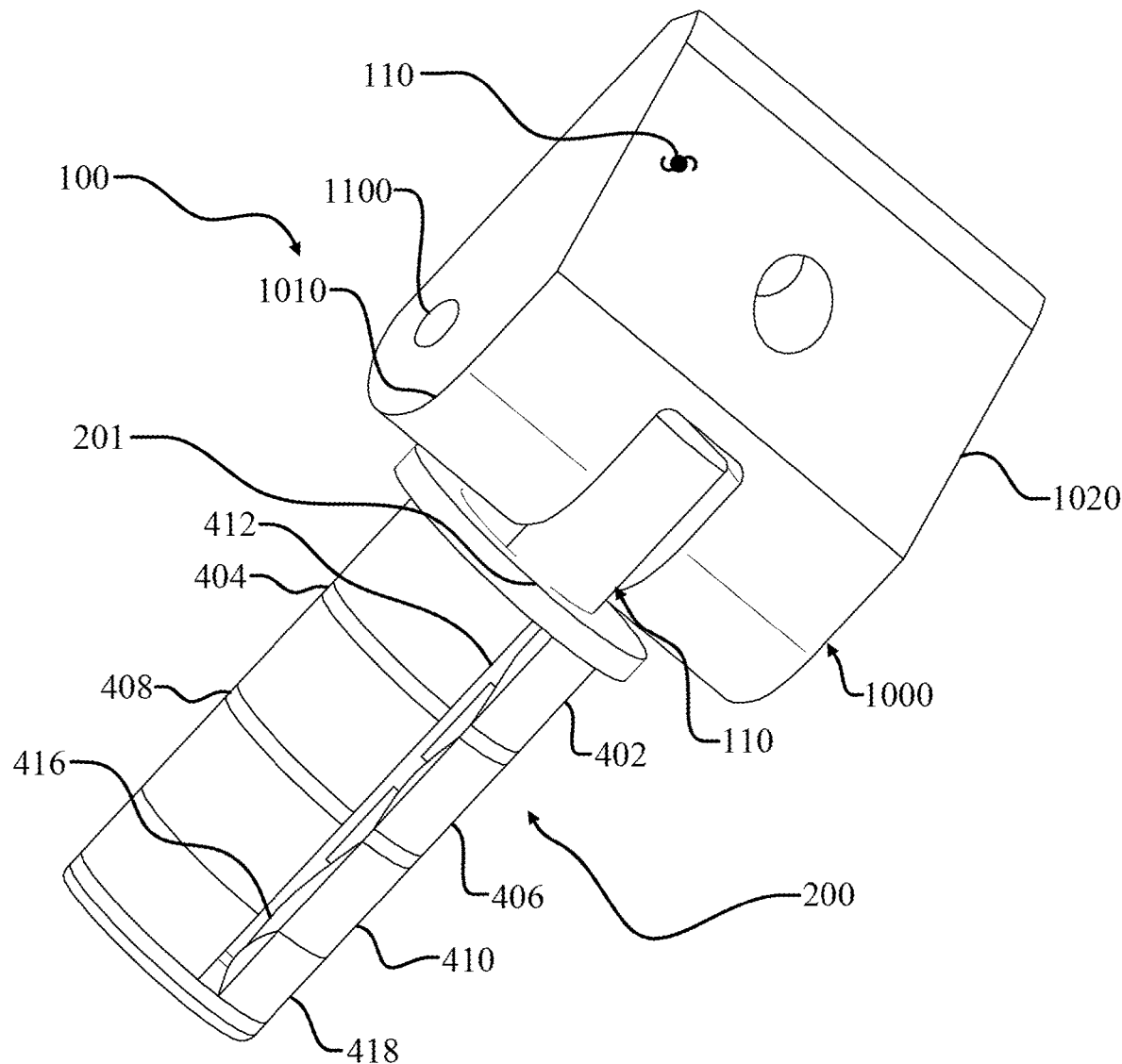
FIG. 2 shows a perspective view of the fastener system with a clamping assembly.

FIG. 2 discloses a bolt-lock fastener assembly which includes a clamping assembly (201), and the shaft of the bolt-lock fastener in the embodiment depicted in FIG. 2 may have threads on both ends of the shaft. The clamping assembly (201) may include a large diameter washer, a nut, and a small diameter washer. Unlike the embodiments of FIGS. 1A-1D, 3A-3D, and 4 whereby rotation of the shaft (120) results in the longitudinal movement and radial expansion of the collar assembly (200), which is a radially-expandable split collar, in the embodiment of FIG. 2 the pivoting of an eccentric cam (1000) from a released position, seen in FIG. 2, to a locked position results in longitudinal movement of the shaft (120), and/or the sleeve (138), and radial expansion of the collar assembly (200), which again is a radially-expandable split collar. All of the disclosure with respect to other embodiments applies equally to this embodiment, however reference will generally be made to the components of FIG. 8. The eccentric cam (1000) of FIG. 2 has a cam pivot (1010) and a paddle segment (1020). A pivot pin (1100) pivotably secures the eccentric cam (1000) to the bolt-lock (110). The shaft (120) is coupled to the pivot pin (1100) so that rotation of the eccentric cam (1000) from the released position to the locked position results in longitudinal movement of the shaft (120) toward the eccentric cam (1000), which in turn results in the compression and expansion of the radially-expandable split collar, which may include a plurality of female collars and a plurality of male collars. In fact, the embodiments shown in FIGS. 2 and 8 have a first female collar (402) having a first female collar flat surface (401), seen best in FIGS. 5 and 8, at one end abutting the washer (400), in FIG. 8, or the bolt-lock (110) in FIG. 2, and a first female collar entrance surface (403) with a first female collar entrance surface length (1306), seen best in FIGS. 5 and 8, at the opposite end that abuts a first male collar (404), and thereby having a first female collar length (1307). The first male collar (404) has a first male collar first angled surface (1405) having a first male collar first angled surface length (1406), a first male collar second angled surface (1505) having a first male collar second angled surface length (1506), and a first male collar intermediary surface (1605) having a first male collar intermediary surface length (1606), as seen in FIG. 8, and an overall first male collar length (1407). A second female collar (406) has a second female collar length (1701), a first entrance surface (1702), and a second entrance surface (1703), as seen in FIG. 8. A second male collar (408) has a second male collar first angled surface (1805) having a second male collar first angled surface length (1806), a second male collar second angled surface (1905) having a second male collar second angled surface length (1906), and a second male collar intermediary surface (2005) having a second male collar intermediary surface length (2006), as seen in FIG. 8, and an overall second male collar length (1807). A third female collar (410) having a third female collar flat surface (2103), seen best in FIG. 8, at one end, and a third female collar entrance surface (2103) with a third female collar entrance surface length (2106) at the opposite end, and thereby having a third female collar length (2107). As illustrated, the first female collar entrance surface length (1306) is less than the first female collar length (1307) but greater than 50% of the first female collar length (1307);

likewise, the third female collar entrance surface length (2106) is less than the third female collar length (2107) but greater than 50% of the third female collar length (2107). Further, the overall first male collar length (1407) is less than the first female collar length (1307), and the overall second male collar length (1807) is less than the third female collar length (2107). Any, or all, of the collars may have a slit (412), seen in FIG. 8, having a slit width (413) that may be greater than the first male collar intermediary surface length (1606) and/or the second male collar intermediary surface length (2006). Additionally, each collar section has a maximum sidewall thickness, and in one embodiment the slit width (413) is greater than the maximum sidewall thickness. Further, the radially-expandable split collar has a longitudinal axis (2000) seen in FIG. 8. Additionally, the first male collar first angled surface length (1406) and the first male collar second angled surface length (1506) are less than the first female collar entrance surface length (1306); likewise, the second male collar first angled surface length (1806) and the second male collar second angled surface length (1906) are less than the first female collar entrance surface length (1306) and/or the third female collar entrance surface length (2106). Further, the first male collar first angled surface length (1406) and the first male collar second angled surface length (1506) are less than 50% of the second female collar length (1701); likewise, the second male collar first angled surface length (1806) and the second male collar second angled surface length (1906) are less than 50% of the second female collar length (1701). As seen in FIG. 2, when the eccentric cam (1010) is in the released position, an outer diameter of the first female collar, the first male collar, the second female collar, the second male collar, and the third female collar are substantially equal.

Figure 3A:
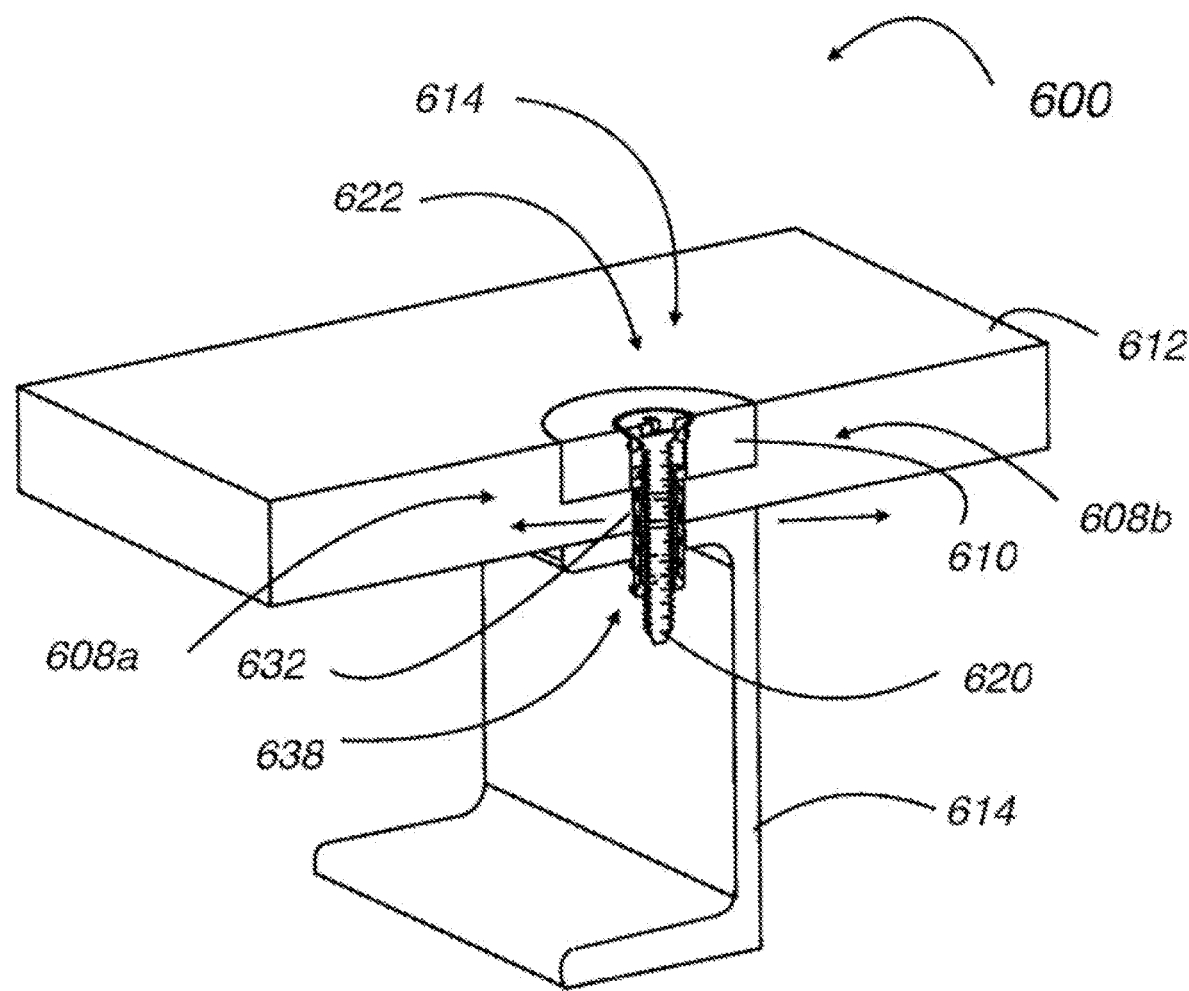
FIG. 3A shows a cross-section of a bolt with a radially-expandable split collar assembly.

FIG. 3A discloses a hybrid cross-section of a bolt with a radially-expandable split collar assembly, such as that of FIGS. 1A-1D, and the bolt assembly (600) has been inserted into an object, namely a panel (612); an anti-rotator assembly may be coupled to the distal end of the bolt-lock fastener. Thus, all of the disclosure relating to the embodiment of FIGS. 1A-1D apply equally to FIGS. 3A-3D, with bolt-lock (110) analogous to bolt-lock (610), shaft (120) analogous to shaft (620), tool-engagement feature (122) analogous to tool-engagement feature (622), head (124) analogous to head (624), female collar (132) analogous to female collar (632), end section female collar (136) analogous to end section female collar (636), and sleeve (138) analogous to sleeve (638). A radially expandable split collar (632) may be located at the proximal end of the shaft (120). The radially-expandable split collar (402), seen in FIG. 4, is similarly disclosed in FIGS. 1A-1D and 3A-3D although not separately labeled, is depicted as being disposed within the panel (612) in FIGS. 3A and 3D. A bolt-fastener assembly may include any number of radially-expandable split collars, including the range of one collar to 1000 collars. Radially-expandable split collar (632) may have a sloped first shoulder (608a) and a sloped second shoulder (608b). The direction of the horizontal arrows depict the direction in which radially-expandable split collar (632) may expand when the bolt-lock is being moved into the closed position.

Figure 3B:
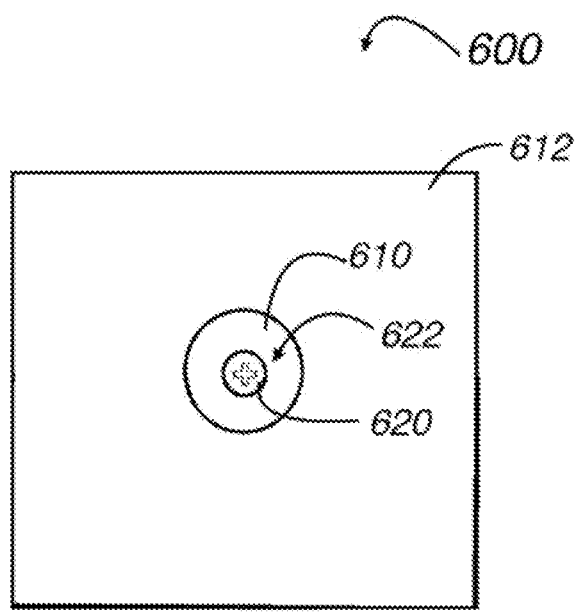
FIG. 3B shows a top plan view of a bolt-lock fastener.
Figure 4:
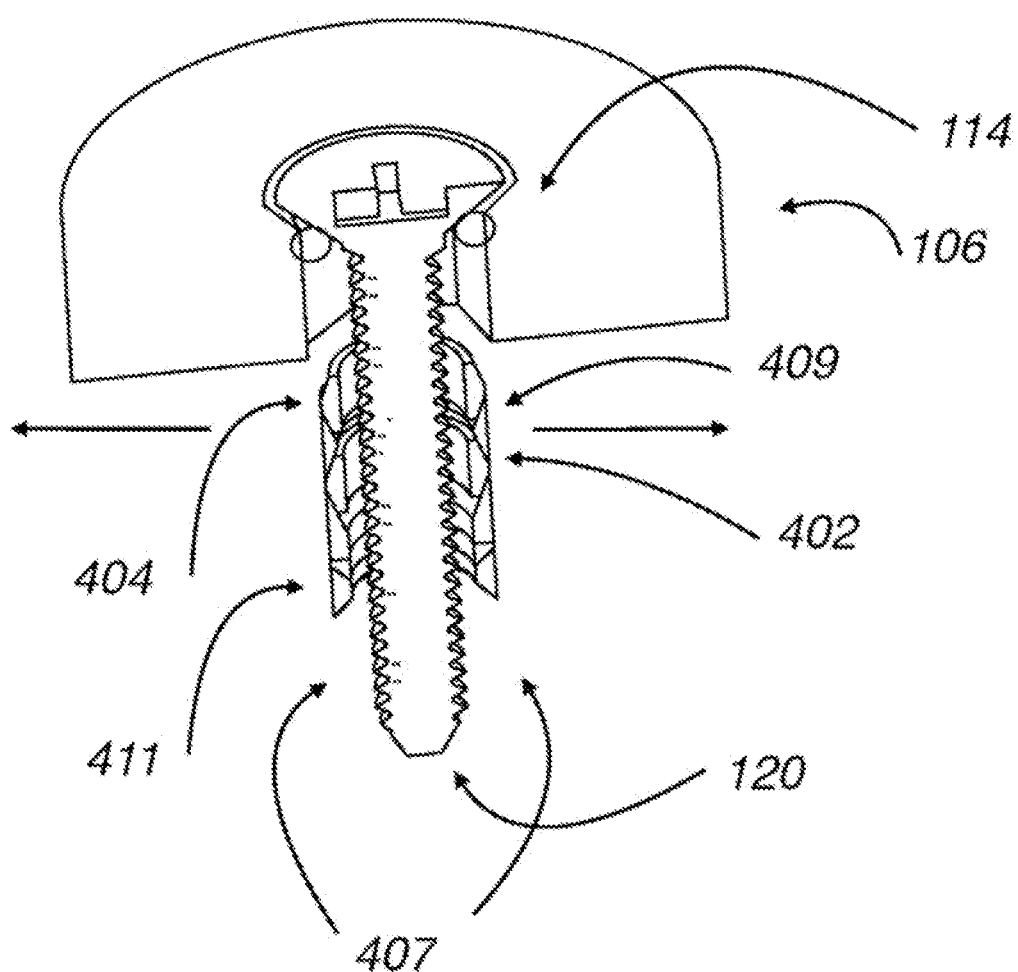
FIG. 4 depicts an alternative embodiment of a bolt-lock fastener.

FIG. 3B discloses a top of a bolt with a radially-expandable split collar assembly, and the bolt assembly has been inserted into an object.

Figure 3C:
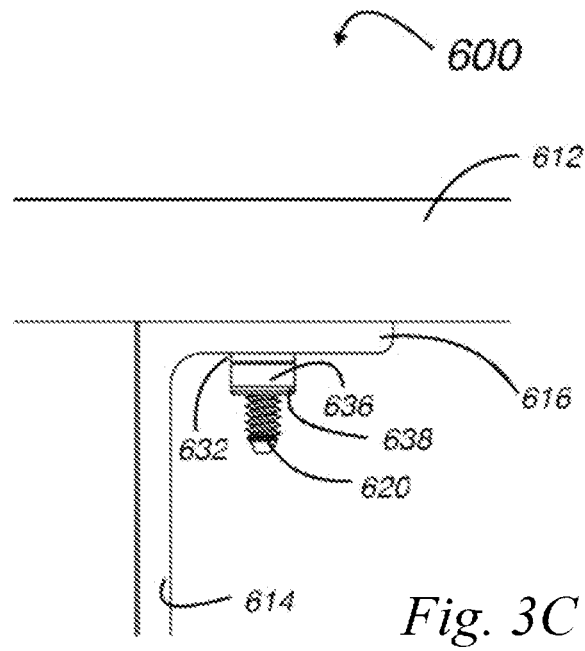
FIG. 3C shows a side elevation view of a bolt-lock fastener.

FIG. 3C discloses a side view of a bolt with a radially-expandable split collar assembly, and the bolt assembly has been inserted into an object.

Figure 3D:
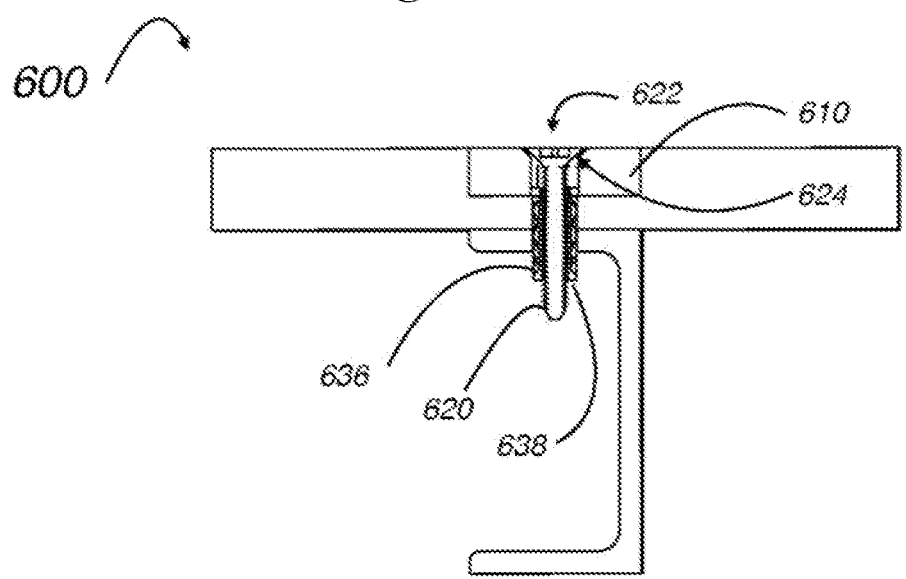
FIG. 3D shows a cross-sectional view of a bolt-lock fastener.

FIG. 3D discloses a cross-section of a bolt with a radially-expandable split collar assembly, and the bolt assembly has been inserted into an object.

Referring to FIG. 4, an alternative embodiment of a bolt-lock fastener assembly is depicted. A male collar (404) is depicted above a female collar (402). The upper edges of female collar (402) may mate with the lower edges of the male collar (404). When pressure is exerted on the male collar (404), the lower edge male collar (404) may serve as an inclined plane and push downwards and outwards against the upper edges of the female collar (402). In some preferred embodiments the shape of the lower edge of the male collar (404) is complementary to the shape of the upper edge of the female collar (402). A first vertical edge (409) defines the left side of a channel; a second vertical edge (411) defines the right side of the channel, and channel edge (407) refers to the first vertical edge (409) and second vertical edge (411) which jointly define a vertical channel. The vertical channel described in the preceding sentence may contract or expand depending on compression or decompression of the corresponding collar.@

Figure 5:
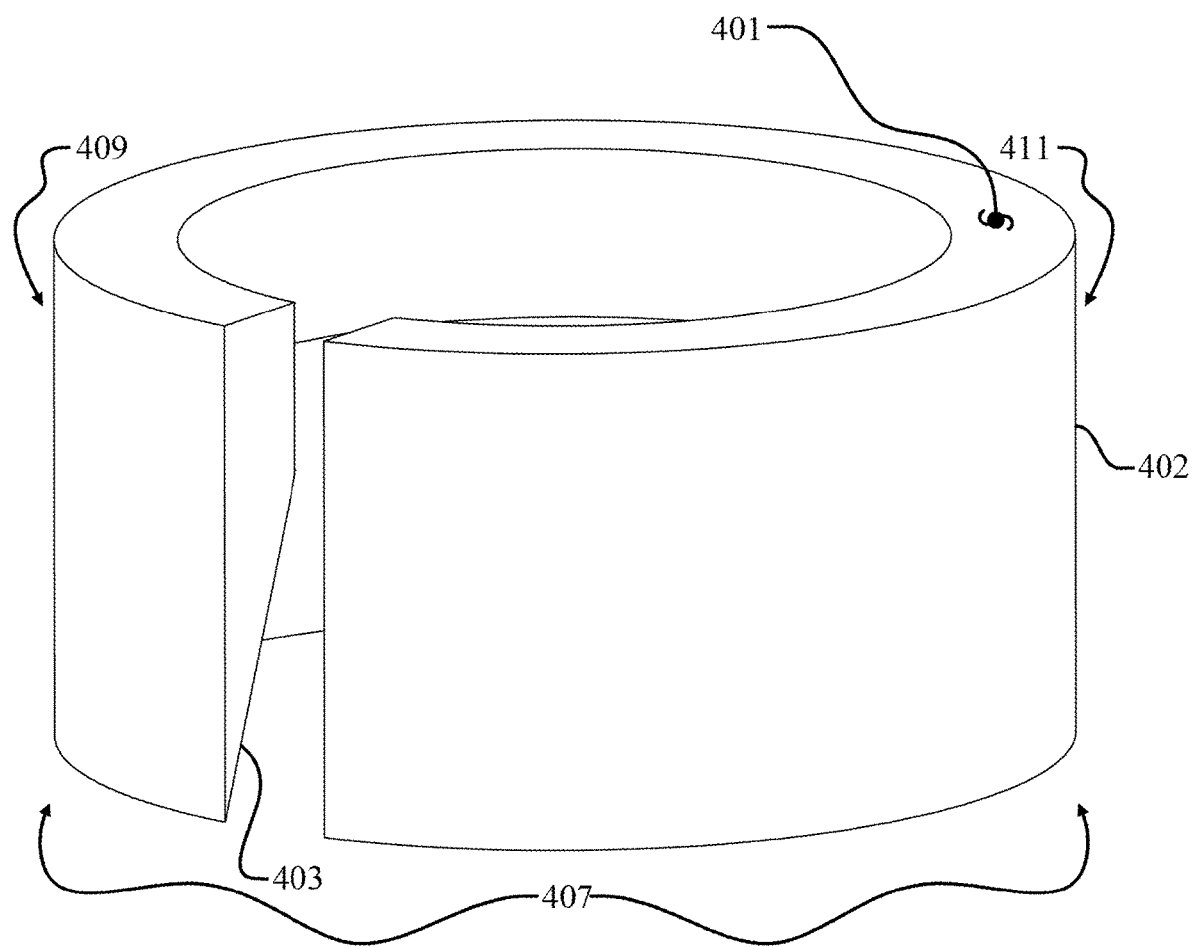
FIG. 5 depicts a view of an alternative embodiment of a female collar.

Referring to FIG. 5 an alternative embodiment of a female collar (402) is depicted. A first vertical edge (409) defines the left side of a channel; a second vertical edge (411) defines the right side of the channel, and channel edge (407) refers to the first vertical edge (409) and second vertical edge (411) which jointly define a vertical channel. The vertical channel described in the preceding sentence may contract or expand depending on compression or decompression of the corresponding collar.

Figure 6:
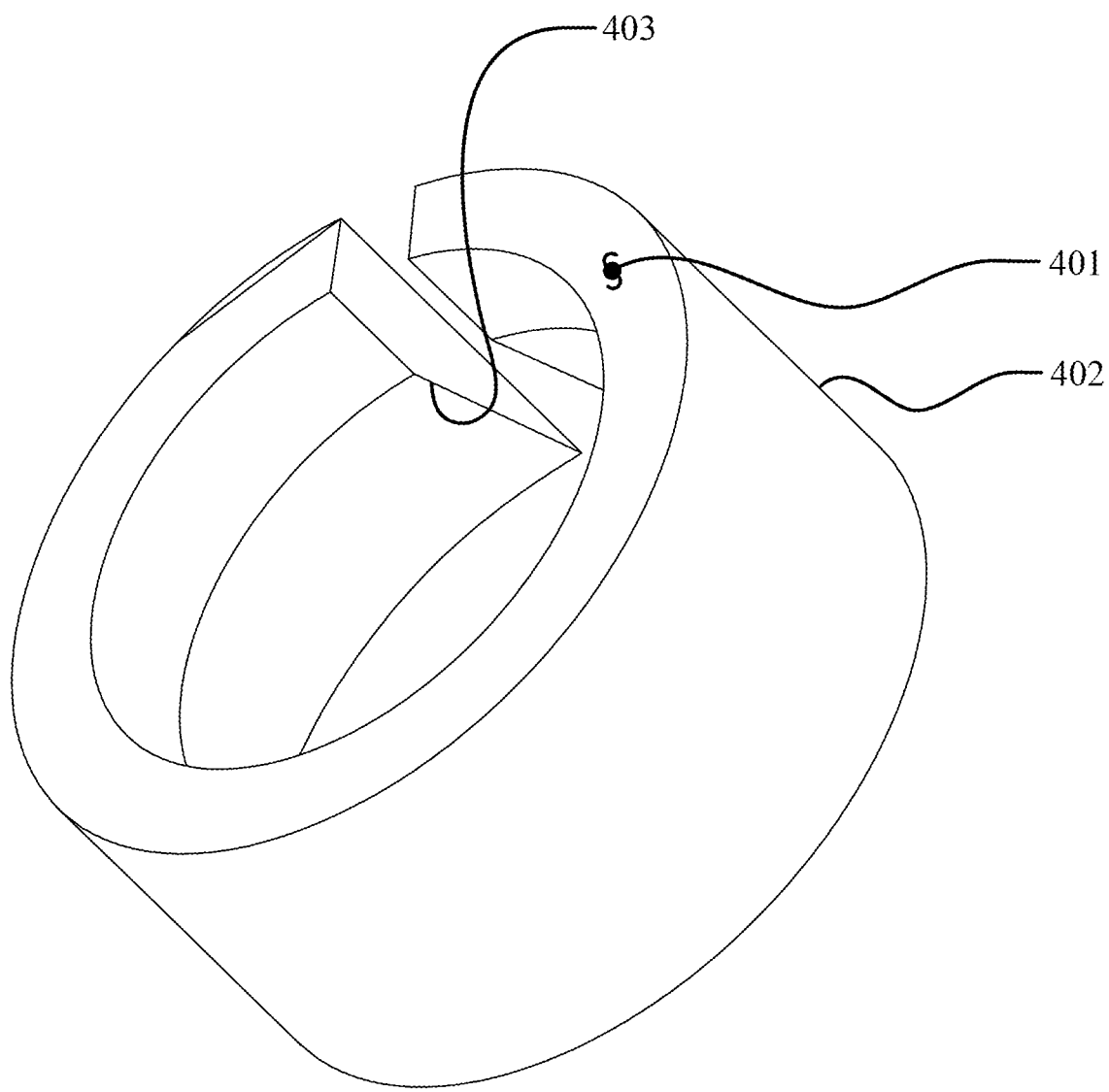
FIG. 6 depicts another embodiment of a female collar.

Referring to FIG. 6, an alternative embodiment of a female collar is depicted. Compared to the embodiments depicted in the FIG. 5, the edge of the collar that has a sloped shoulder may have a steeper incline and may be useful for increasing the retention strength of the collar, which may be useful for decreasing slippage rates of the collar.

Figure 7A:
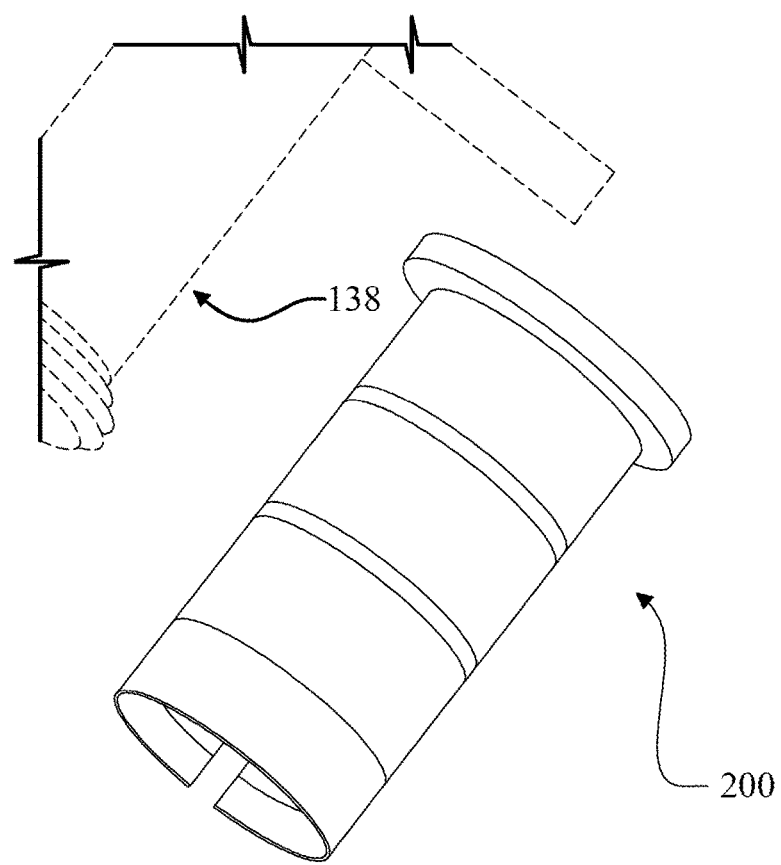
FIG. 7A shows a perspective views of a collar assembly.

In FIG. 7A perspective view of a collar assembly (200) is depicted. The collars of the collar assembly each define a vertical channel, and in some preferred embodiments, the collars of the collar assembly are aligned to defined a combined channel which includes the channels of each of the collars.

Figure 7B:
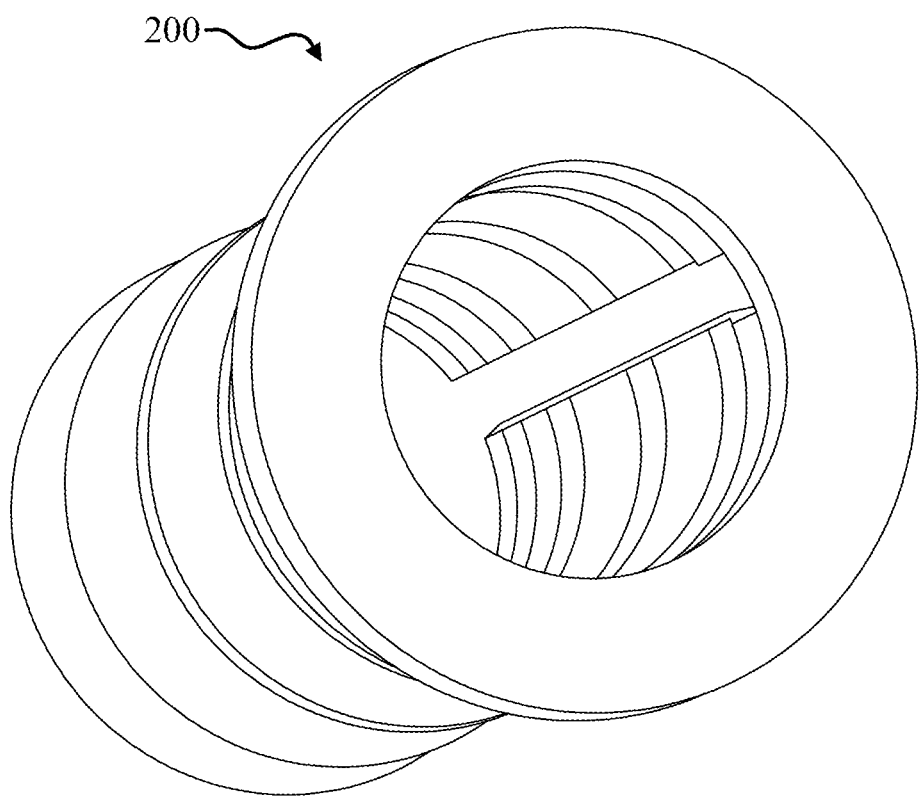
FIG. 7B shows a perspective view of a collar assembly.

In FIG. 7B a top perspective view of the collar assembly (200) is depicted; the shaft is not shown. In the preferred embodiments a collar assembly (200) is coupled to a shaft.

FIG. 8 discloses an exploded view of the collar assembly; in some preferred embodiments the collar assembly is located within the panel and the washer (400) is located directly above the panel. Although, the washer depicted in this figure is a ring, the washer may be shaped differently; in the preferred embodiments the washer has an annular ring section or a section which mates with the central shaft of the bolt-lock fastener assembly. The collar assembly may include a first female collar (402); the first female collar may be coupled to a first male collar (404), which are analogous to the FIG. 1D embodiment first female collar (132) and first male collar (134). The first male collar (404) may be coupled to both the first female collar (402) and to a second female collar (406). The second female collar (406) may also be coupled to a second male collar (408), and the second male collar (408) may also be coupled to a third female collar (410). In some embodiments, the first male collar and the second male collar are substantially the same in shape and size. As disclosed in the figures, in some embodiments the first female collar includes a wedge section, with the point of the wedge section pointing away from the top of the shaft. The upper edges of the first male collar may be configured to mate with the first female collar, and the lower edge of the first male collar may be configured to mate with the upper edges of the second female collar. The lower edges of the second female collar may be configured to mate with the upper edges of a second male collar, and the lower edges of the second male collar may be configured to mate with the upper edges of the third female collar. At the bottom of the collar assembly is a collar retainer assembly (414); a collar retainer may include any number of components; however, in the preferred embodiments, the collar retainer assembly may include two components. As seen in FIG. 8, the collar retainer assembly (414) may include a female collar retainer (418) and a male collar retainer (416), which may abut the third female collar (410), a configuration also illustrated, but not labeled, in FIGS. 1D and 4. The outer edge of the female collar retainer (418) may be configured to mate with the lower surface of the male collar retainer (416). The top surface of the female collar retainer (416) may be substantially smooth and may be configured to detachably contact all or substantially all of the lower surface of the adjacent female collar (410).

In the preferred embodiments none of the collar retainers or none of the collars of the collar assembly form a continuous annular ring but instead define a slot. As shown in FIG. 8, when the collar assembly is stacked on top of the collar retainer, the slots of the collar retainer assembly and the slots of the collars of the collar assembly may be aligned to form a channel that runs parallel to the longitudinal axis of the shaft. In some embodiments, the slots of the collar retainers of the collar retainer assembly and the slots of the collars of the collar assembly may allow the collar retainers and the collars to expand or compress.

In the preferred embodiments, each collar is configured to mate or be in substantial contact with the adjacent face of the adjacent collar. In the most preferred embodiments, some or all of the collars are wedge shaped, which may be useful in allowing for the expansions of the collar assembly when pressure is applied.

The fastener assembly disclosed herein may be used to retain a stress skin panel to a spar.

Additional benefits and features of the fastener system will be apparent to those skilled in the art. While the invention has been described with reference to preferred embodiments, those skilled in the art will understand that various changes may be made and equivalents may be substituted for elements thereof without departing from the scope of the invention. In addition, many modifications may be made to adapt a particular situation or material to the teachings of the invention without departing from the essential scope thereof. Since certain changes may be made in the above system without departing from the scope of the invention herein involved, it is intended that all matter contained in the above descriptions and examples or shown in the accompanying drawings shall be interpreted as illustrative and not in a limiting sense. Also, all citations referred herein are expressly incorporated herein by reference. All terms not specifically defined herein are considered to be defined first according to Webster's New Twentieth Century Dictionary Unabridged, Second Edition and second, if not found in the preceding book, The McGraw-Hill Dictionary of Scientific and Technical Terms, Seventh Edition. The disclosures of all of the citations provided are being expressly incorporated herein by reference. The disclosed invention advances the state of the art and its many advantages include those described and claimed.

I claim:

1. A fastener system comprising;
    a bolt-lock having an internal bore extending from a first side to a second side;
    a threaded shaft having a shaft head, and at least a portion of the shaft extending through the internal bore;
    a threaded sleeve engaging a portion of the threaded shaft;
    a generally cylindrical collar assembly surrounding a portion of the threaded sleeve and constrained by a portion of the threaded sleeve;
    wherein the collar assembly includes at least:
        a first male collar having a first male collar first angled surface having a first male collar first angled surface length;
        a first female collar adjacent the first male collar, and having a first female collar length, a first female collar first entrance surface with a first female collar first entrance surface length, and a first female collar second entrance surface with a first female collar second entrance surface length;
        a second male collar adjacent the first female collar, and having a second male collar first angled surface having a second male collar first angled surface length, a second male collar second angled surface having a second male collar second angled surface length, and an overall second male collar length;
        a second female collar adjacent the second male collar, and having a second female collar first entrance surface with a second female collar first entrance surface length, and a second female collar length;
    wherein rotation of the threaded shaft moves the threaded sleeve toward the shaft head and compressing the collar assembly from a relaxed state to a compressed state and resulting in sliding engagement of a portion of (a) the first male collar first angled surface and the first female collar first entrance surface, (b) the first female collar second entrance surface and the second male collar first angled surface, and (c) the second male collar second angled surface and the second female collar first entrance surface, thereby radially expanding at least a portion of the first female collar and the second female collar.

2. The fastener system of claim 1, wherein the second male collar has a second male collar intermediary surface having a second male collar intermediary surface length, located between the second male collar first angled surface and the second male collar second angled surface, wherein the second male collar intermediary surface separates the first female collar from the second female collar in the relaxed state.

3. The fastener system of claim 2, wherein the first female collar and the second female collar each have a slit extending throughout their length with a slit width that is greater than the second male collar intermediary surface length.

4. The fastener system of claim 2, wherein the first male collar and the second male collar each has a slit extending throughout their length with a slit width that is greater than the second male collar intermediary surface length.

5. The fastener system of claim 1, wherein the first female collar and the second female collar each have a slit extending throughout their length with a slit width, the first female collar has a first female collar maximum sidewall thickness, and the slit width is greater than the first female collar maximum sidewall thickness.

6. The fastener system of claim 1, wherein the second male collar first angled surface length is less than the first female collar first entrance surface length, and the second male collar second angled surface length is less than 50% of the second female collar length.

7. The fastener system of claim 6, wherein the second male collar second angled surface length is less than the second female collar entrance surface length, and the second male collar first angled surface length is less than 50% of the second female collar length.

8. The fastener system of claim 1, wherein an outer diameter of the first female collar, the first male collar, the second female collar, and the second male collar are substantially equal prior to radially expansion.

9. The fastener system of claim 1, wherein the overall second male collar length is less than the first female collar length.

10. The fastener system of claim 1, wherein the internal bore of the bolt-lock creates a stop feature that restricts longitudinal movement of the collar assembly.

11. The fastener system of claim 1, wherein the second female collar has a second female collar second entrance surface with a second female collar second entrance surface length and adjacent a threaded sleeve angled surface, and rotation of the threaded shaft moves the threaded sleeve toward the shaft head compressing the collar assembly and resulting in sliding engagement of a portion of the second female collar second entrance surface and the threaded sleeve angled surface.

12. The fastener system of claim 11, wherein the second female collar second entrance surface length is not equal to the second female collar first entrance surface length.

13. The fastener system of claim 1, further including a gasket between the shaft head and the bolt-lock.

14. A fastener system comprising;
   a bolt-lock having an internal bore extending from a first side to a second side;
   a threaded shaft having a shaft head, and at least a portion of the shaft extending through the internal bore;
   a threaded sleeve engaging a portion of the threaded shaft;
   a generally cylindrical collar assembly surrounding a portion of the threaded sleeve and constrained by a portion of the threaded sleeve;
   wherein the collar assembly includes at least:
      a first male collar having a first male collar first angled surface having a first male collar first angled surface length;
      a first female collar adjacent the first male collar, and having a first female collar length, a first female collar first entrance surface with a first female collar first entrance surface length, and a first female collar second entrance surface with a first female collar second entrance surface length;
      a second male collar adjacent the first female collar, and having a second male collar first angled surface having a second male collar first angled surface length, a second male collar second angled surface having a second male collar second angled surface length, and an overall second male collar length;
      a second female collar adjacent the second male collar, and having a second female collar first entrance surface with a second female collar first entrance surface length, and a second female collar length;
   wherein the first female collar and the second female collar each have a slit extending throughout their length with a slit width, the first female collar has a first female collar maximum sidewall thickness, and the slit width is greater than the first female collar maximum sidewall thickness;
   wherein the second male collar first angled surface length is less than the first female collar first entrance surface length, and the second male collar second angled surface length is less than 50% of the second female collar length;
   wherein the second male collar second angled surface length is less than the second female collar entrance surface length, and the second male collar first angled surface length is less than 50% of the second female collar length;
   wherein an outer diameter of the first female collar, the first male collar, the second female collar, and the second male collar are substantially equal prior to radially expansion; and
   wherein rotation of the threaded shaft moves the threaded sleeve toward the shaft head and compressing the collar assembly from a relaxed state to a compressed state and resulting in sliding engagement of a portion of (a) the first male collar first angled surface and the first female collar first entrance surface, (b) the first female collar second entrance surface and the second male collar first angled surface, and (c) the second male collar second angled surface and the second female collar first entrance surface, thereby radially expanding at least a portion of the first female collar and the second female collar.

15. The fastener system of claim 14, wherein the second male collar has a second male collar intermediary surface having a second male collar intermediary surface length, located between the second male collar first angled surface and the second male collar second angled surface, wherein the second male collar intermediary surface separates the first female collar from the second female collar in the relaxed state.

16. The fastener system of claim 15, wherein the first female collar and the second female collar each have a slit extending throughout their length with a slit width that is greater than the second male collar intermediary surface length.

17. The fastener system of claim 15, wherein the first male collar and the second male collar each has a slit extending throughout their length with a slit width that is greater than the second male collar intermediary surface length.

18. The fastener system of claim 14, wherein the overall second male collar length is less than the first female collar length.

19. The fastener system of claim 14, wherein the second female collar has a second female collar second entrance surface with a second female collar second entrance surface length and adjacent a threaded sleeve angled surface, and rotation of the threaded shaft moves the threaded sleeve toward the shaft head compressing the collar assembly and resulting in sliding engagement of a portion of the second female collar second entrance surface and the threaded sleeve angled surface.

20. A fastener system comprising;
   a bolt-lock having an internal bore extending from a first side to a second side;
   a threaded shaft having a shaft head, and at least a portion of the shaft extending through the internal bore;
   a threaded sleeve engaging a portion of the threaded shaft;
   a generally cylindrical collar assembly surrounding a portion of the threaded sleeve and constrained by a portion of the threaded sleeve;

wherein the collar assembly includes at least:
a first male collar having a first male collar first angled surface having a first male collar first angled surface length;
a first female collar adjacent the first male collar, and having a first female collar length, a first female collar first entrance surface with a first female collar first entrance surface length, and a first female collar second entrance surface with a first female collar second entrance surface length;
a second male collar adjacent the first female collar, and having a second male collar first angled surface having a second male collar first angled surface length, a second male collar second angled surface having a second male collar second angled surface length, and an overall second male collar length;
a second female collar adjacent the second male collar, and having a second female collar first entrance surface with a second female collar first entrance surface length, and a second female collar length;
wherein the first female collar and the second female collar each have a slit extending throughout their length with a slit width;
wherein an outer diameter of the first female collar, the first male collar, the second female collar, and the second male collar are substantially equal prior to radially expansion; and
wherein rotation of the threaded shaft moves the threaded sleeve toward the shaft head and compressing the collar assembly from a relaxed state to a compressed state and resulting in sliding engagement of a portion of (a) the first male collar first angled surface and the first female collar first entrance surface, (b) the first female collar second entrance surface and the second male collar first angled surface, and (c) the second male collar second angled surface and the second female collar first entrance surface, thereby radially expanding at least a portion of the first female collar and the second female collar.

* * * * *